(12) United States Patent
Miyazawa (10) Patent No.: US 8,783,569 B2
(45) Date of Patent: Jul. 22, 2014

(54) CARD PROCESSING DEVICE

(75) Inventor: Shinya Miyazawa, Nagano (JP)

(73) Assignee: Nidec Sankyo Corporation (JP)

( * ) Notice: Subject to any disclaimer, the term of this patent is extended or adjusted under 35 U.S.C. 154(b) by 794 days.

(21) Appl. No.: 12/602,592

(22) PCT Filed: May 30, 2008

(86) PCT No.: PCT/JP2008/001365
§ 371 (c)(1),
(2), (4) Date: Jun. 1, 2010

(87) PCT Pub. No.: WO2008/149529
PCT Pub. Date: Dec. 11, 2008

(65) Prior Publication Data
US 2010/0252630 A1 Oct. 7, 2010

(30) Foreign Application Priority Data
Jun. 1, 2007 (JP) ................................. 2007-146472

(51) Int. Cl.
*G06K 7/06* (2006.01)
*G06K 5/00* (2006.01)
*G06K 7/00* (2006.01)
*G06K 19/06* (2006.01)

(52) U.S. Cl.
USPC ........................... 235/441; 235/492; 235/380

(58) Field of Classification Search
CPC ... G06K 7/0021; G06K 7/003; G06K 7/1491; G06K 13/08; G06K 13/06; G06K 13/063; G06K 13/085; G06K 7/08; G06K 13/02; G06K 13/077; G06K 7/0073

USPC ......... 235/441, 493, 487, 449, 439, 492, 486, 235/435
See application file for complete search history.

(56) References Cited

U.S. PATENT DOCUMENTS

| | | | |
|---|---|---|---|
| 4,575,703 A | | 3/1986 | Shishido |
| 5,949,048 A | * | 9/1999 | Nakamura et al. ............. 235/439 |
| 6,820,806 B2 | * | 11/2004 | Nagata et al. .................. 235/493 |
| 2004/0173677 A1 | | 9/2004 | Lucas et al. |
| 2005/0023348 A1 | | 2/2005 | Lucas et al. |
| 2007/0084933 A1 | * | 4/2007 | Zhang et al. ................... 235/493 |

FOREIGN PATENT DOCUMENTS

| | | |
|---|---|---|
| DE | 3326522 A1 | 1/1984 |
| EP | 0307692 A1 | 3/1989 |
| EP | 1457919 A1 | 9/2004 |
| FR | 2530845 A1 | 1/1984 |

(Continued)

OTHER PUBLICATIONS

International Search Report for PCT/JP2008/001365 mailed Sep. 2, 2008 with English translation.

*Primary Examiner* — Thien T Mai
(74) *Attorney, Agent, or Firm* — Cantor Colburn LLP (57) ABSTRACT

A card processing device has a card insertion section into which a card is inserted, a card receiving section in which the card is received with a rear end section of the inserted card exposed from the card insertion section, a reader that reads information recorded in the card received in the card receiving section, a holding member that holds a front end section of the card and, in response to a card-pulling operation by an operator, releases the front end section of the card, and a detector that detects that the card is at a position held by the holding member.

7 Claims, 7 Drawing Sheets

(56) References Cited

FOREIGN PATENT DOCUMENTS

| | | | |
|---|---|---|---|
| GB | 2124420 A | 2/1984 |
| JP | 59-149576 A | 8/1984 |
| JP | 64-39553 U | 3/1989 |
| JP | 2000-259777 A | 9/2000 |
| JP | 2005-44063 A | 2/2005 |

\* cited by examiner

CARD PROCESSING DEVICE

CROSS REFERENCE TO RELATED APPLICATIONS

This is a U.S. national stage of application No. PCT/JP2008/001365, filed on May 30, 2008. Priority under 35 U.S.C. §119(a) and 35 U.S.C. §365(b) is claimed from Japanese Application No. 2007-146472, filed Jun. 1, 2007, the disclosure of which is also incorporated herein by reference.

TECHNICAL FIELD

The present invention relates to a card processing device; more specifically, it relates to a card processing device in which the structure of a holding member for holding cards is simple and designed to be attachable and detachable.

BACKGROUND

In recent years, cards are used in various fields; proposed variously are manual card processing devices in which cards are operated by hand for processing information recorded on the cards. Among such manual card readers, there is a type of card reader in which cards are inserted into a card insertion slot provided to the card reader, pushed all the way inside, and pulled out so that the card reader reads/writes information from/on the cards. Such a card processing device may have a lock mechanism which locks the cards inserted into the device. For example, Patent reference 1 suggests a card processing device in which a sensor arranged in the IC chip unit is activated when a card is inserted in a card guiding passage, a motor starts rotating accompanied by the rotation of a clank fixed to a motor shaft, and then a lock lever connected with the clank is moved diagonally to lock the card.

Also, Patent reference 2 suggests a card processing device having a beam which opens the card passage by pushing a nail protruding into the card passage and blocking it so that the lock mechanism will not be unlocked even when a card is pulled out during the data processing, or the lock mechanism will be unlocked when the card is pulled out after the data processing.

Also, at game centers and casinos, there may be a system that gives points or manages the play status according to the duration of the play time measured by the time a user's (player's) card is kept in the card processing device. For such a case, in order to prevent the user from forgetting to pull out the card from the card processing device or to prevent the card from being stolen, a hole is punched out in one end of the card and a chain, cord or string is put through the hole so that the card can be tied to the user when in use.

Patent reference 1: Japanese Patent Application Tokkai 2000-259777 Unexamined Publication Patent reference 2: Japanese Patent Application Tokkai 2005-44063 Unexamined Publication In the above case, a card is tied to a user (player) and therefore there are few problems such as lost or stolen cards; therefore, the card processing device to which a card is inserted needs to be structured such that the card is inserted to a predetermined position and held there firmly enough not to be easily pulled out by the motion of the user (player) during the operation, and also such that the insertion and removal of the card is easy. It is a demand that such card processing devices not be complicated or expensive but be inexpensive and easy to maintain.

In the card processing devices proposed in the above Patent references 1 and 2, cards can be held firmly inside the card processing device, but cannot be removed easily, and more components are required, thus making it difficult to downsize and increasing cost of the device. Also, the device structure is complicated; therefore, when the lock mechanism is broken or damaged, it is difficult to repair or replace it, requiring higher cost. When the lock mechanism is driven electrically, current consumption is increased.

At least an embodiment of the present invention provides a card processing device in which a card inserted to a predetermined position is held firmly enough not to be easily pulled out by the user's motion during the operation, cards can be inserted and removed easily, the device can be manufactured inexpensively and its maintenance is easy.

SUMMARY OF THE INVENTION

To solve the above problems and to achieve the above advantages, an embodiment of a card processing device comprises a card inserting portion in which a card is inserted, a card accommodating portion in which the card is accommodated with the rear end portion of the inserted card being exposed from the card inserting portion, a reading means for reading information recorded on the card accommodated in the card accommodating portion, a holding member which holds the front end portion of the card deep inside the card accommodating portion and releases the front end portion of the card held deep inside when a user pulls out the card, and a detecting means for detecting that said card is in a position of being held by the holding member.

In at least an embodiment, the holding member is provided in the card processing device; therefore, cards will not be pulled out easily even by the motion of a player during play, and card insertion and removal are easy. In addition, the card is held and released by the holding member; therefore, the card processing device can be made inexpensively with easy maintenance. Also, the detecting means is provided for detecting that the card is in a position being held by the holding member; therefore, if the device is configured such that a signal is output when the card is held or released by the holding member and a host device regulates when receiving the signal, the card-holding signal or card-releasing signal can be displayed on the display of the game machine.

It is preferred in the card processing device that the holding member have a pressing portion which holds the card by pressing one face of the front end portion of the card in the thickness direction and an inclining portion which, when the card is inserted, abuts the front end of the card and guides the card to the pressing portion and pushes the card back toward the card inserting portion with the pressing force thereof until the front end of the card reaches the pressing portion.

At least an embodiment of the holding member has a pressing portion and an inclining portion; therefore, the card which has reached the pressing portion against the push-back force of the inclining portion is held by the pressing force of the pressing portion. Note that the card not reaching the pressing portion is pushed back at the inclining portion; therefore, when the card reaches the pressing portion, an operator's hand can feel that the card has reached the pressing portion.

It is preferred in the card processing device that the holding member be a resilient member integrally molded in a clip-like shape. At least an embodiment of the holding member is a resilient member integrally molded in a clip-like shape; therefore, the number of components is fewer, cards can be firmly held in the card processing device, and cards can be removed easily. Also unlike a conventional technology, the lock mechanism is not driven electrically; therefore, the card processing device can be manufactured inexpensively and its maintenance is easy.

It is preferred in the card processing device that the holding member be attached to the card accommodating portion by a snap-fit connection structure. At least an embodiment of the holding member is attached to the card accommodating portion by a snap-fit connection structure; therefore, the holding member can be replaced easily, thus maintenance cost is reduced.

Further, it is preferred in the card processing device that a control means be provided for communicating with the host device using the card-holding signal or card-releasing signal detected by the detecting means. In at least an embodiment, a control means is provided for communicating with the host device using the card-holding signal or card-releasing signal detected by the detecting means; therefore, if a control is set up in the host device that receives the signal communicated by the control means, the card-holding signal or card-releasing signal can be displayed on the display of the game machine.

It is preferred in the card processing device that the detecting means have a lever member which swings as pushed by the front end of the card and a photo sensor which detects the swing of the lever member. Thus, the card position can be detected with high precision.

It is preferred in the card processing device that the reading means be a magnetic head. Thus, cards having a magnetic strip can be used in the card processing device.

It is preferred in the card processing device that the reading means be an IC contact terminal which performs IC communication by contact or non-contact with an IC chip provided on the cards. Thus, cards having a built-in IC chip can be used in the card processing device.

According to the card processing device in at least an embodiment of the present invention, a card cannot easily be pulled out even by the motion of a user during the operation, cards can be inserted and removed easily, and the cards can be held and released by the holding member; therefore, the device can be made inexpensively and its maintenance is easy.

Also, since the detecting means is provided, it can be configured such that a signal is output when the card is held by or released from the holding member and a control is set up in the host device that receives the signal; then, the card-holding signal or card-releasing signal can be displayed on the display of the game machine, for example. Also, since the holding member has a pressing portion and an inclining portion, the card which has reached the pressing portion against the push-back force of the inclining portion is held by the pressing force of the pressing portion.

Also, at game centers and casinos, there may be a system that gives points or manages the play status according to the duration of the play time measured by the time a user's (player's) card is kept in the card processing device. For such a case, in order to prevent the user from forgetting to pull out the card from the card processing device or to prevent the card from being stolen, it is preferred that a hole be punched out in one end of the card and a chain, cord or string be put through the hole so that the card can be tied to the user. The card can be held firmly enough not to be pulled out easily by the motion of a player during the game, the card can be easily inserted into and easily removed from the card processing device; the device is not complicated or expensive but can be manufactured at low cost with easy maintenance.

BRIEF DESCRIPTION OF DRAWING

Embodiments will now be described, by way of example only, with reference to the accompanying drawings which are meant to be exemplary, not limiting, and wherein like elements are numbered alike in several Figures, in which.

DETAILED DESCRIPTION OF PREFERRED EMBODIMENTS

Preferred embodiments will be described hereinafter based on the drawings. A card processing device of the present invention is not limited to the following description and the drawings within the range of the technical characteristics.

Figure 1:
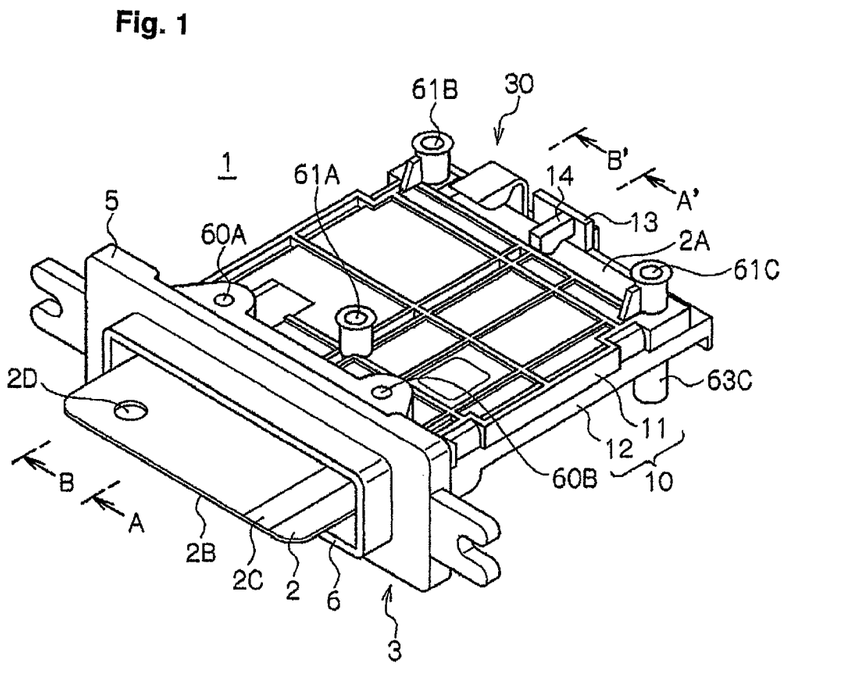
FIG. 1 is a perspective view of a card processing device according to at least an embodiment of the present invention, observed from the card inserting portion side.
Figure 2:
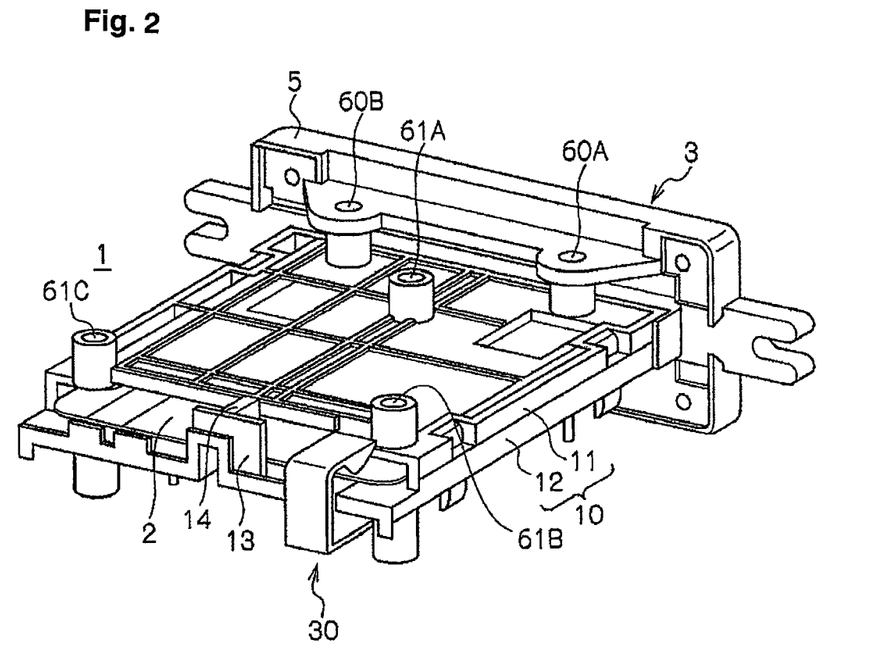
FIG. 2 is a perspective view of the card processing device according to at least an embodiment of the present invention, observed from the other side.
Figure 3:
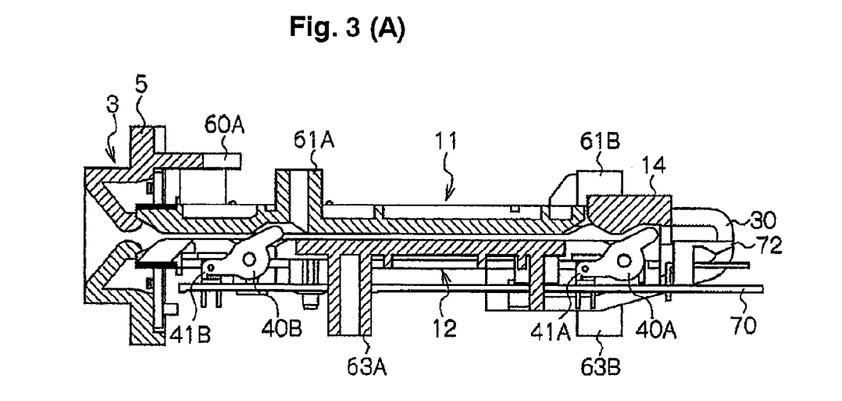
FIGS. 3(A)-3(B) are an A-A' cross-sectional view (A) of the card processing device shown in FIG. 1 and a B-B' cross-sectional view (B) of the card processing device shown in FIG. 1.
Figure 4:
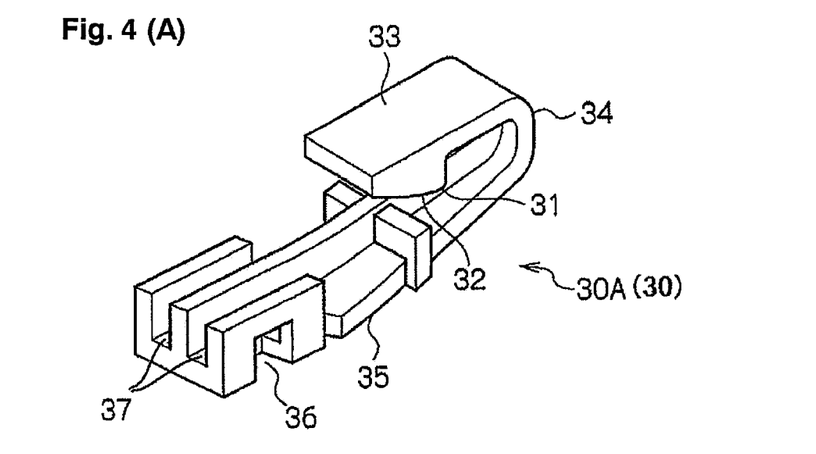
FIGS. 4(A)-4(B) are perspective views of a holding member provided in the card processing device according to at least an embodiment of the present invention.
Figure 5:
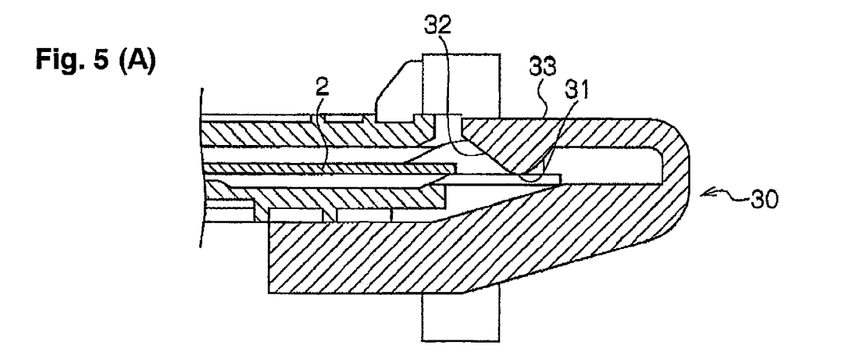
FIGS. 5(A)-5(C) are cross-sectional views showing the status [of the device] when a card is inserted into the holding member.
Figure 6:
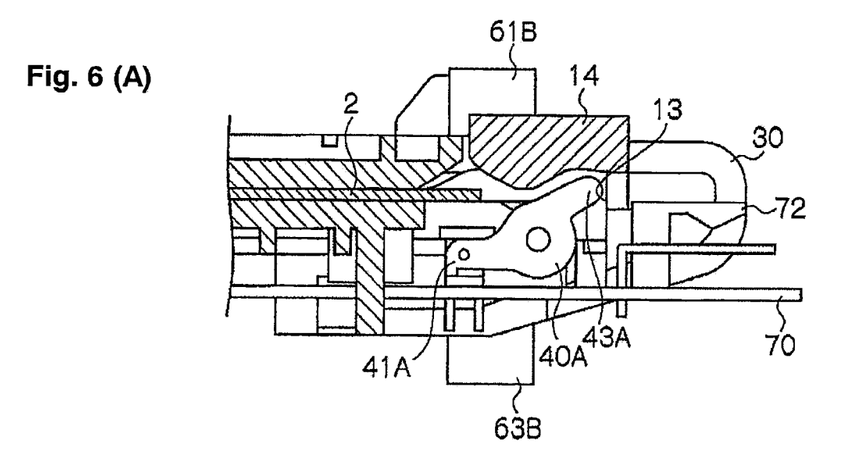
FIGS. 6(A)-6(B) are diagrams to explain the detection by a detecting means.
Figure 7:
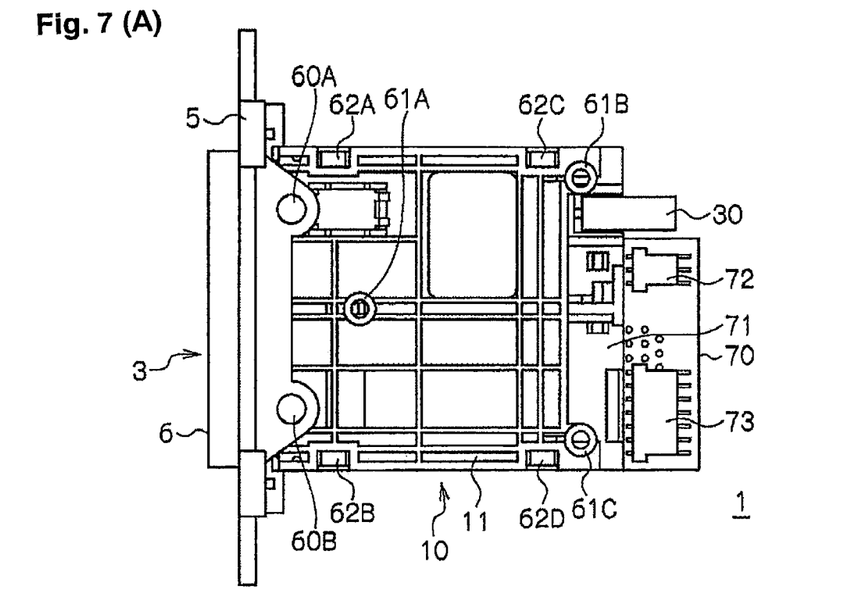
FIGS. 7(A)-7(B) are a top view and a bottom view of the card processing device according to at least an embodiment of the present invention in which a print board is installed.

FIG. 1 a perspective view of a card processing device, observed from the card inserting portion side. FIG. 2 is a perspective view of the card processing device, observed from the opposite side from the card inserting portion side. FIGS. 3(A)-3(B) is an A-A' cross-sectional view of the card processing device shown in FIG. 1 and a B-B' cross-sectional view (B) of the card processing device shown in FIG. 1. FIGS. 4(A)-4(B) are perspective views of a holding member provided in the card processing device. FIGS. 5(A)-5(C) are cross-sectional views of the status of the device when a card is inserted into the holding member. FIGS. 6(A)-6(B) show diagrams to explain the detection by the detecting means. FIGS. 7(A)-7(B) show a top view and a bottom view of the card processing device in which a print board is installed. Note that, in the following description and the drawings, letters are used following the numbers to differentiate the members when there are a plurality of the same kind of members corresponding to the number codes, and only number codes along are used to describe the members generally.

As shown in FIG. 1 through FIG. 3(B), the card processing device 1 comprises a card inserting portion 3 in which a card 2 is inserted, a card accommodating portion 10 for accommodating the card 2 with the rear end portion 2B thereof exposed from the card inserting portion 3, a reading means 20 for reading information recorded on the card 2 which is accommodated in the card accommodating portion 10 (see FIGS. 7(A)-7(B)), a holding member 30 which holds the front end portion 2A of the card deep inside the card accommodating portion 10 and releases the front end portion 2A of the card held inside with the pulling operation of the card 2 by a user, and detecting means 40A and 40B for detecting that the card 2 is in a position of being held by the holding member 30. In this patent application, the "rear end portion 2B" of the card 2 is the portion exposed from the card inserting portion 3 shown in FIG. 1, and the "front end portion 2A" is the opposite portion of the card 2 inside. Each configuration is described below.

The card 2 used in the card processing device 1 may be, as shown in FIG. 1, a card having a magnetic strip 2C, a card having an IC chip or a card having both. The usage of the card is not specified, but the card may be used as a play card in game centers or casinos, as mentioned above. In this case, a hole 2D may be punched out in the portion of the card which will be exposed when inserted into the device so that a chain, cord, or string can be put though it. The dimensions (the thickness and width) of the card to be used in the card processing device 1 is not specified; the card can be any size as long as the card can satisfy the physical dimension defined by the ISO or JIS standard.

The card inserting portion 3 is the portion in which the card 2 is inserted; as shown in FIG. 1 and FIGS. 3(A)-3(B), it is formed by a member tapered toward the inside so that the card 2 is easily inserted into a transport passage 4 in the card processing device 1. As shown in FIG. 1, the card inserting portion 3 may be provided with flanges 5, 5 for attaching the device to a game machine, etc.

The card accommodating portion 10 is the portion for accommodating the card 2 inserted from the card inserting portion 3; as shown in FIG. 1 through FIG. 3(B), it is formed by a member consisting of a top member 11 and a bottom member 12. The card 2 inserted into the card accommodating portion 10 is accommodated such that the rear end portion 2B thereof is exposed from the card inserting portion 3 by a predetermined length. It is preferred that the length of the exposed area be sufficient so that a user can easily pull it out by hand. Also, its length can be changed according to the card usage as long as the front end of the inserted card 2 can be regulated by a stopper 13 abutting it.

The accommodating space for the card 2 is configured by the top member 1 and the bottom member 12 which are preferably a resin mold as illustrated in the figure; it is preferred as shown in FIG. 1 through FIG. 3(B) and FIGS. 7(A)-7(B) that each member 11, 12 respectively have connection holes 60, 61 which are connected to another member by screws, for example.

The reading means 20 is for reading information recorded on the card 2 which is accommodated in the card accommodating portion 10, and its examples are a magnetic head used for the card 2 having a magnetic strip 2C and an IC contact terminal used for the card 2 having a built-in IC chip. Note that the IC contact terminal is for an IC communication through contact or non-contact with the IC chip.

More specifically described, when the card 2 having the magnetic strip 2C as shown in FIG. 1 is used, it is preferred that a magnetic head be provided as the reading means 20 in a position that would face the magnetic strip 2C, as shown in FIG. 7(B). Note that the description of the IC contact terminal is omitted here, but it is preferred that the IC contact terminal be arranged in a position that would face the IC chip in the same manner as the magnetic head.

The holding member 30, as shown in FIG. 1 through FIG. 5(C), is a member which holds the front end portion 2A of the card deep inside the card accommodating portion 10 and releases the front end portion 2A of the card held deep inside with the operation of the pulling out of the card by an operator. Such a holding member 30 is configured at least by a pressing portion 31, which holds the card 2 by pressing one side of the front end portion 2A of the card 2 in the card thickness direction, and an inclining portion 32 which, when the card 2 is inserted, abuts the front end of the card 2 and guides the card 2 to the pressing portion 31 and pushes back the card 2 toward the card inserting portion with the pressing force until the front end of the card 2 reaches the pressing portion 31.

The holding members 30A, 30B as shown in FIGS. 4(A)-4(B) are specific examples of the holding member 30; a resilient member integrally molded in a clip-like shape is preferred. Note that the holding member 30A and the holding member 30B are different in the shape of the arm portion (configured by the parts 35, 34, 33) which is bent in a substantially U shape, but are the same functionally; therefore, they are described as the holding member 30. The holding member 30 shown in FIGS. 4(A)-4(B) is attached to the card accommodating portion by a snap-fit connection structure consisting of a recess portion 37 and a snap-fit portion 36. The snap-fit portion 36 is fixed by engaging with a snap (not illustrated) in the card accommodating portion 10. The pressing portion 31 and the inclining portion 32 are molded to the front end (on 33 side) of the arm portion configured by the parts (35, 34, 33), which is bent at the recess portion 37 in a substantially U shape; the pressing portion 31 is arranged to face one side of the front end portion of the card 2 so as to press the inserted card 2, and the inclining portion 32 is arranged such that the inclining face is on the side of the card inserting portion 3. Note that, in this embodiment, a protrusion formed in the recess portion 37 is for maintaining the strength of the holding member 30.

By the above-mentioned snap-fit connection structure, the snap-fit portion (a nail portion) 36 formed to the holding member 30 (a member on one side) is elastically deformed to engage with the snap (a nail engaging portion) arranged to a member on the other side (the card accommodating portion 10). With such a connection structure, the snap-fit portion (the nail portion) 36 can be easily detached from the snap which is not illustrated. In this embodiment, the holding member 30 is a resin-molded body; however, it is not limited to this, but may be molded of metal.

As shown in FIGS. 5(A)-5(B), when the card 2 inserted by a weak force hits the inclining portion 32, the card 2 is pushed back toward the card inserting portion 3 by the inclining portion provided at the front end of the elastic arm portion. Further, when a user inserts the card 2, as shown in FIG. 5(C), the card inserted against the push-back force proceeds against the push-back force of the inclining portion 32 and reaches beyond the position of the pressing portion 31. At that time, the card 2 which has reached the pressing portion 31 is held by the pressing force of the pressing portion 31. Note that, when the card reaches the pressing portion 31, the hand of the user pushing the card in can feel that the card 2 has reached all the way back and therefore, the user can sense that the card is held there.

The detecting means 40A, 40B are for detecting that the card is in a position of being held by the holding member 30. Various kinds of sensors may be used as the detecting means 40A, 40B; as shown in FIG. 3(A) and FIGS. 6(A)-6(B), for example, it is preferred that the detecting means be equipped with lever members 41A and 41B, which swing as pushed by the front end of the card 2, and the photo sensors 42A and 42B, which detect the swing of the lever member 41. A sensor mechanism is configured such that a light-emitting device and a light-receiving device are arranged to face each other and the sensor is turned ON when the light-receiving device detects that the above-mentioned lever member 41 is pushed by the front end of the card 2 and swings and intercepts the light-receiving device. It is preferred that one or more such detecting means 40A, 40B be provided so that they may be arranged to face the card surface which does not have the magnetic strip 2C thereon; as shown in FIG. 3(A), for example, one detecting means can be arranged in a position opposed to the support member 14 formed in the center of the card accommodating portion 10 in the width direction, and another detecting means can be arranged in a position distanced from the aforementioned position in the direction of the card inserting portion 3.

It is preferred that such detecting means 40A, 40B be arranged in positions at which it can be confirmed that the card 2 has reached deep inside the card accommodating portion 10 and held by the holding member 30. For example, as shown with the lever member 41A in FIG. 6(A), when the card 2 has not reached the holding member 30 in the card accommodating portion 10, one end 43A of the lever member 41A is present in the passage of the card 2 and the other end of the lever member 41A turns OFF the photo sensor 42A; as shown in FIG. 6(B), when the card 2 has reached the holding member 30 in the card accommodating portion 10, the one end 43A of the lever member 41A is brought down by the card 2 and then the other end 41A turns ON the photo sensor 42A.

The card-holding signal or the card-releasing signal detected by the detecting means 40A and 40B is communicated with a host device by a control means. As shown in FIGS. 7(A)-7(B), the control means can be arranged in a print board 70 arranged in the bottom member 12 of the card accommodating portion 10. Note that the magnetic head (the reading means 20) and various electronic components are arranged in a component mounting portion 71 of the print board 70, and connector components 72 and 73 are arranged further inside for signal communication with external sources.

As described above, at least an embodiment of the present invention has the holding member 30; therefore, the card processing device can be provided in which the card 2 will not be pulled out easily even by a player's motion during the operation (play), and the card 2 can be easily inserted and easily removed. In addition, since the card 2 can be held and released by the holding member 30, the card processing device 1 can be formed inexpensively and its maintenance is easy. Also, the detecting means 40A, 40B are provided for detecting that the card 2 is in a position of being held by the holding member 30; therefore, if the device is configured such that a signal is output when the card 2 is held or released by the holding member 30 and the host device receives the signal for control, the signal of holding or releasing the card 2 can be displayed on the display of the game machine.

At least an embodiment of the card processing device 1 of the present invention is described above; however, the present invention is not limited to the above embodiment, but can be variously modified within the scope of the present invention.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. A card processing device for use with a card, the card processing device comprising:
   a card inserting portion in which the card is inserted;
   a card accommodating portion which structured to accommodate said card while a rear end portion of the inserted card is exposed from said card inserting portion;
   a reader structured to read information recorded on said card;
   a holding member structured to hold a front end portion of said card inside said card accommodating portion and release the front end portion of the card with a card-pulling operation by a user; and
   a detector structured to detect that said card is in a position of being held by said holding member;
   wherein the holding member is a resilient member having a pressing portion configured to press against a face of the card in a thickness direction of the card and an inclining portion which is continuously formed with the pressing portion to guide the card to the pressing portion; and
   wherein the inclining portion is formed so that, when said card is inserted and a front end of said card is abutted with the inclining portion, said card is subjected to a push-back force toward said card inserting portion by an inclined face of the inclining portion and, when said card is further inserted against the push-back force until said card reaches said pressing portion, the pressing portion presses the face of the card in a thickness direction of the card and the card is held by the pressing portion.

2. The card processing device as set forth in claim 1 wherein said holding member is a resilient member integrally molded in a substantially U-shape.

3. The card processing device as set forth in claim 1 wherein said holding member is attached to said card accommodating portion by a snap-fit connection structure.

4. The card processing device as set forth in claim 1, further comprising:
   a controller structured to communicate with a host device using a card-holding signal or card-releasing signal detected by said detecting means.

5. The card processing device as set forth in claim 1 wherein said detector has a lever member which swings as pushed by the front end of said card and a photo sensor which detects a swing of said lever member.

6. The card processing device as set forth in claim 1 wherein said reader is a magnetic head.

7. The card processing device as set forth in claim 1 wherein said reader is an IC contact terminal which performs an IC communication by contact or non-contact with an IC chip built into said card.

* * * * *